(12) United States Patent
Muller et al.

(10) Patent No.: US 12,153,983 B2
(45) Date of Patent: Nov. 26, 2024

(54) RFID ASSEMBLY AND ASSEMBLY METHOD THEREOF

(71) Applicant: EM Microelectronic-Marin SA, Marin (CH)

(72) Inventors: Paul Muller, Marin-Epagnier (CH); Christophe Entringer, Corcelles-près-Concise (CH); Pierre Muller, Marin-Epagnier (CH); Thomas Coulot, Vercel-Villedieu-le-Camp (FR); Arthur Hugh MacDougall, Cornaux (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 18/251,043

(22) PCT Filed: Nov. 1, 2021

(86) PCT No.: PCT/EP2021/080257
§ 371 (c)(1),
(2) Date: Apr. 28, 2023

(87) PCT Pub. No.: WO2022/090534
PCT Pub. Date: May 5, 2022

(65) Prior Publication Data
US 2023/0409863 A1    Dec. 21, 2023

(30) Foreign Application Priority Data
Oct. 30, 2020  (EP) ..................................... 20205021

(51) Int. Cl.
*G06K 19/077* (2006.01)

(52) U.S. Cl.
CPC ... *G06K 19/07722* (2013.01); *G06K 19/0775* (2013.01)

(58) Field of Classification Search
CPC ..................... G06K 19/07722; G06K 19/0775
(Continued)

(56) References Cited

U.S. PATENT DOCUMENTS 8,511,569 B1    8/2013  Koepp et al.
9,070,066 B1 *  6/2015  Oliver .................. H01Q 1/2216
(Continued)

FOREIGN PATENT DOCUMENTS

EP          2 050 130         4/2009
WO    WO 2008/007326 A2    1/2008
WO    WO 2008/007326 A3    1/2008

OTHER PUBLICATIONS

International Search Report issued Feb. 9, 2022 in PCT/EP2021/080257 filed Nov. 1, 2021 3 pages.

*Primary Examiner* — Allyson N Trail
(74) *Attorney, Agent, or Firm* — Oblon, McClelland, Maier & Neustadt, L.L.P.

(57) ABSTRACT

An RFID assembly and an assembly method thereof are provided. The assembly method for an RFID assembly comprises a step of providing at least one integrated circuit which includes at least one IC contact and at least one dielectric layer, and a deposition of at least one electrical contact and of at least one re-passivation layer. The at least one electrical contact is deposited on at least one first portion and the at least one re-passivation layer is deposited on at least one second portion, which is distinct of the at least one first portion.

14 Claims, 6 Drawing Sheets

(58) Field of Classification Search
USPC .......................................................... 235/488
See application file for complete search history.

(56) References Cited

U.S. PATENT DOCUMENTS

| | | | |
|---|---|---|---|
| 9,633,302 B1* | 4/2017 | Heinrich | ................. H01L 24/08 |
| 10,311,353 B1* | 6/2019 | Diorio | ................. H01Q 1/2225 |
| 10,331,993 B1 | 6/2019 | Koepp et al. | |
| 11,423,278 B1* | 8/2022 | Koepp | .............. H01L 21/76802 |
| 2019/0073579 A1 | 3/2019 | Kato | |
| 2023/0409863 A1* | 12/2023 | Muller | ............. G06K 19/07722 |

* cited by examiner

RFID ASSEMBLY AND ASSEMBLY METHOD THEREOF

TECHNICAL FIELD

The technical field of the present invention regards the assembly methods of RFID assembly.

STATE OF THE ART

RFID assembly comprises some electrical contacts made of a small metal deposition layer and some re-passivation layer, which are present below the electrical contact.

Indeed, in standard assembly of electrical contact, anisotropic glue is deposited at a location of contact between the electrical contact and inlay. The chip with electrical contact is assembled onto a PET substrate with metallization traces, typically aluminum, sometimes copper, silver or other conductive material, the glue creates the electrical contact between the chip electrical contact and the metal traces on the inlay.

Thermo-compression occurs in order to ensure both mechanical stability and reliable electrical contact between inlay substrate and the electrical contacted silicon chip. During the assembly compression, it has been observed that the PET inlay substrate is distorted by the assembly pressure.

Due to flexibility of the PET inlay and of the re-passivation layer, the thermo-compression applied during the film assembly process generates variability in the distance between the inlay aluminum traces and metal connections within the integrated circuit as the inlay flexes. Curing pressure, temperature, duration act upon the distance between the metals and the resulting assembly capacitance.

It is necessary to control the assembly capacitances between the antenna terminal and the input of the integrated circuit in order to ensure that the impedance matching and RFID tag performance remains within specification. Too high variation of the input capacitances will induce a critical loss of UHF power sensitivity.

SUMMARY OF THE INVENTION

The present invention relates to an assembly method for an RFID assembly comprising:
  Providing at least one integrated circuit; said at least one integrated circuit comprising at least one IC contact and at least one dielectric layer;
  Deposition of at least one electrical contact directly on and in contact with said at least one IC contact and/or with said at least one dielectric layer; and,
  Re-passivation of said at least one integrated circuit by depositing at least one re-passivation layer directly on and in contact with said at least one integrated circuit, preferably by deposition of said at least one re-passivation layer directly on and in contact with said at least one IC contact and/or with said at least one dielectric layer.

Thus, the thermo-compression applied during the film assembly method generates a constant distance, rather thickness, between said at least one integrated circuit and the top of said at least one electrical contact and the top of said at least one re-passivation layer.

According to an embodiment, said at least one electrical contact is deposited on at least one first portion and/or said at least one re-passivation layer is deposited one at least on second portion; said at least one first portion is distinct of said at least one second portion.

Thus, said at least one electrical contact does not overlap said at least one re-passivation layer or vice versa, and the thermo-compression applied during the film assembly method generates a constant distance, rather thickness, between said at least one integrated circuit and the top of said at least one electrical contact and the top of said at least one re-passivation layer According to an embodiment, at least one electrical contact is deposited with at least one primary dimension and said at least one re-passivation layer is deposited with at least one secondary dimension; a dimension ratio of said at least one primary dimension to said at least one secondary dimension is comprised between 0.5 and 2, preferably between 0.9 and 1.11.

Thus, said at least one electrical contact has substantially the same dimension, rather thickness as said at least one re-passivation layer, and when the thermo-compression applied during the film assembly method generates a constant distance, rather thickness, between said at least one integrated circuit and the top of said at least one electrical contact and the top of said at least one re-passivation layer.

According to an embodiment, said at least one electrical contact comprises at least one first electrical contact surface and at least one second electrical contact surface opposite to said at least one first electrical contact surface and/or wherein said at least one re-passivation layer comprises at least one first re-passivation layer surface and at least one second re-passivation layer surface opposite to said at least one first re-passivation layer surface; said at least one primary dimension is comprised between said at least one first electrical contact surface and said at least one second electrical contact surface and/or said at least one secondary dimension is comprised between said at least one first re-passivation layer surface and said at least one second re-passivation layer surface.

Thus, said at least one electrical contact has substantially the same thickness as said at least one re-passivation layer, and when the thermo-compression applied during the film assembly method generates a constant thickness between said at least one integrated circuit and the top of said at least one electrical contact and the top of said at least one re-passivation layer.

According to an embodiment, said at least one first electrical contact surface is directly on and in contact with said at least one IC contact and/or with said at least one dielectric layer and/or said at least one first re-passivation layer surface is directly on and in contact with said at least one IC contact and/or with said at least one dielectric layer.

Thus, said at least one electrical contact does not overlap said at least one re-passivation layer or vice versa, and the thermo-compression applied during the film assembly method generates a constant distance, rather thickness, between said at least one integrated circuit and the top of said at least one electrical contact and the top of said at least one re-passivation layer According to an embodiment, said assembly method comprises an RFID Tag forming by superimposing at least one film directly on and in contact with said at least one electrical contact and said at least one re-passivation layer.

Thus, the thermo-compression applied during the film assembly method generates a constant distance, rather thickness, between said at least one integrated circuit and the top of said at least one electrical contact and the top of said at least one re-passivation layer such as the antenna terminal and the input of said at least one integrated circuit match and the RFID assembly performance remains within specification.

According to an embodiment, said at least one first electrical contact surface and at least one second electrical contact surface are linked via at least one intermediate electrical contact surface and said at least one first re-passivation layer surface and said at least one second re-passivation layer surface are linked via at least one intermediate re-passivation layer surface; said at least one intermediate electrical contact surface is configured to be directly on or under and in contact with said at least one intermediate re-passivation layer surface.

Thus, said at least one electrical contact does not overlap said at least one re-passivation layer or vice versa, and the thermo-compression applied during the film assembly method generates a constant distance, rather thickness, between said at least one integrated circuit and the top of said at least one electrical contact and the top of said at least one re-passivation layer.

According to an embodiment, said at least one film comprises at least one antenna terminal and said RFID Tag forming comprises contact forming by contacting said at least one antenna terminal to said at least one electrical contact.

Thus, the thermo-compression applied during the film assembly method generates a constant distance, rather thickness, between said at least one integrated circuit and the top of said at least one electrical contact and the top of said at least one re-passivation layer such as the antenna terminal and the input of said at least one integrated circuit match and the RFID assembly performance remains within specification.

The present invention relates to an RFID assembly comprising at least one:
integrated circuit; said at least one integrated circuit including at least one IC contact and at least one dielectric layer;
electrical contact; said at least one electrical contact is directly on and in contact with said at least one IC contact and/or with said at least one dielectric layer; and,
re-passivation layer; said at least one re-passivation layer is directly on and in contact with said at least one integrated circuit.

Thus, the constant distance, rather thickness, between said at least one integrated circuit and the top of said at least one electrical contact and the top of said at least one re-passivation layer allows ensuring an impedance matching between the antenna terminal and the input of said at least one integrated circuit such that said RFID assembly performance remains within specification.

According to an embodiment, said at least one electrical contact is deposited on at least one first portion and/or said at least one re-passivation layer is deposited one at least on second portion; said at least one first portion is distinct of said at least one second portion.

Thus, said at least one electrical contact does not overlap said at least one re-passivation layer or vice versa, and the thermo-compression applied during the film assembly method generates a constant distance, rather thickness, between said at least one integrated circuit and the top of said at least one electrical contact and the top of said at least one re-passivation layer According to an embodiment, said at least one electrical contact comprising at least one primary dimension and said at least one re-passivation layer comprising at least one secondary dimension; a dimension ratio of said at least one primary dimension to said at least one secondary dimension is comprised between 0.5 and 2, preferably between 0.9 and 1.11.

Thus, the constant distance, rather thickness, between said at least one integrated circuit and the top of said at least one electrical contact and the top of said at least one re-passivation layer allows ensuring an impedance matching between the antenna terminal and the input of said at least one integrated circuit such that said RFID assembly performance remains within specification.

According to an embodiment, said at least one electrical contact comprises at least one first electrical contact surface and at least one second electrical contact surface opposite to said at least one first electrical contact surface and/or wherein said at least one re-passivation layer comprises at least one first re-passivation layer surface and at least one second re-passivation layer surface opposite to said at least one first re-passivation layer surface; said at least one primary dimension is comprised between said at least one first electrical contact surface and said at least one second electrical contact surface and/or said at least one secondary dimension is comprised between said at least one first re-passivation layer surface and said at least one second re-passivation layer surface.

Thus, the constant distance, rather thickness, between said at least one integrated circuit and the top of said at least one electrical contact and the top of said at least one re-passivation layer allows ensuring an impedance matching between the antenna terminal and the input of said at least one integrated circuit such that said RFID assembly performance remains within specification.

According to an embodiment, said at least one first electrical contact surface is directly on and in contact with said at least one IC contact and/or with said at least one dielectric layer and/or said at least one first re-passivation layer surface is directly on and in contact with said at least one IC contact and/or with said at least one dielectric layer.

Thus, the constant distance, rather thickness, between said at least one integrated circuit and the top of said at least one electrical contact and the top of said at least one re-passivation layer allows ensuring an impedance matching between the antenna terminal and the input of said at least one integrated circuit such that said RFID assembly performance remains within specification.

According to an embodiment, said at least one first electrical contact surface and at least one second electrical contact surface are linked via at least one intermediate electrical contact surface and said at least one first re-passivation layer surface and said at least one second re-passivation layer surface are linked via at least one intermediate re-passivation layer surface; said at least one intermediate electrical contact surface is configured to be directly on or under and in contact with said at least one intermediate re-passivation layer surface.

According to an embodiment, said RFID assembly comprises at least one film including at least one antenna terminal directly connected to said at least one electrical contact.

Thus, the constant distance, rather thickness, between said at least one integrated circuit and the top of said at least one electrical contact and the top of said at least one re-passivation layer allows ensuring an impedance matching between the antenna terminal and the input of said at least one integrated circuit such that said RFID assembly performance remains within specification.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1:
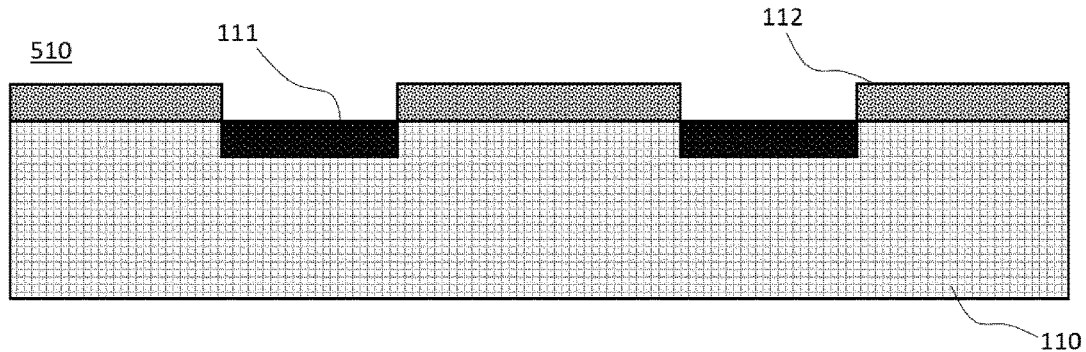
FIG. 1 represents a step of providing at least one integrated circuit 110 according to an embodiment.

As early mentioned, it is necessary to control the assembly capacitances between the antenna terminal and the input of the integrated circuit in order to ensure that the impedance matching and RFID tag performance remains within specification. Too high variation of the input capacitances will induce a critical loss of UHF power sensitivity.

Therefore, the applicant proposes an assembly method 500 for an RFID assembly 100. Said RFID assembly 100 comprises at least one integrated circuit 110 including at least one IC contact 111 and at least one dielectric layer 112. Said at least one integrated circuit 110 is provided 510 and at least one electrical contact 120 is deposited 530 directly on and in contact with said at least one IC contact 111 and/or with said at least one dielectric layer 112, FIG. 1.

Said at least one IC contact 111 may be an electric layer realized during the manufacturing process of said at least one integrated circuit 110 and said at least one IC contact 111 is integrated in said at least one integrated circuit 110. Said at least one IC contact 111 may be used for test purposes.

As illustrated in FIG. 1, said at least one dielectric layer 112 may be deposited after said at least one IC contact 111 and at the end of the manufacturing process of said at least one integrated circuit 110 and said at least one dielectric layer 112 may comprise an opening configured to let appear said at least one IC contact 111 such as to avoid undesired contact and/or oxydation when said at least one IC contact 111 may be used for test purposes, and said at least one dielectric layer 112 may cover said at least one integrated circuit 110, preferably may cover integrally said at least one integrated circuit 110 excepted said at least one IC contact 111.

Figure 2A:
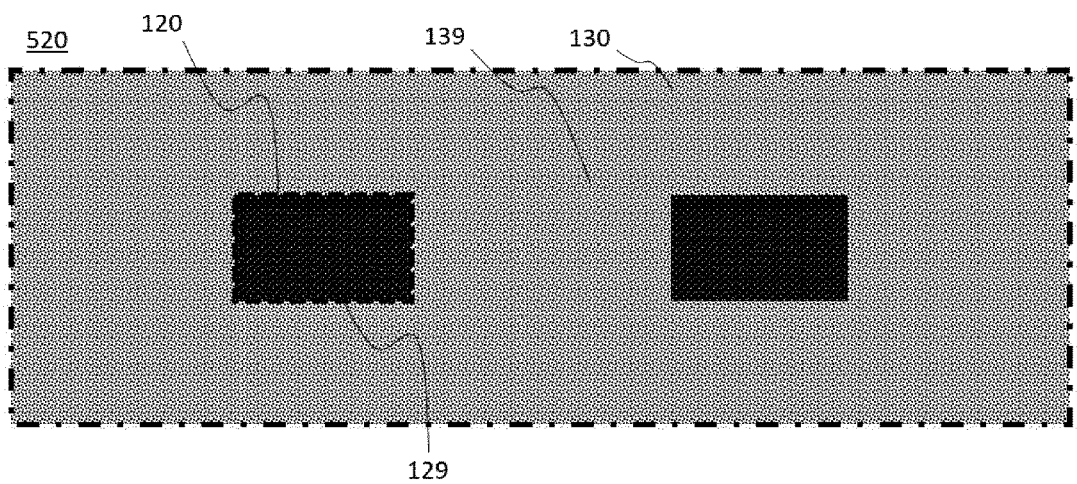
FIGS. 2A and 2B represent a step of delimitation of at least one first portion 129 and at least on second portion 139.
Figure 2B:
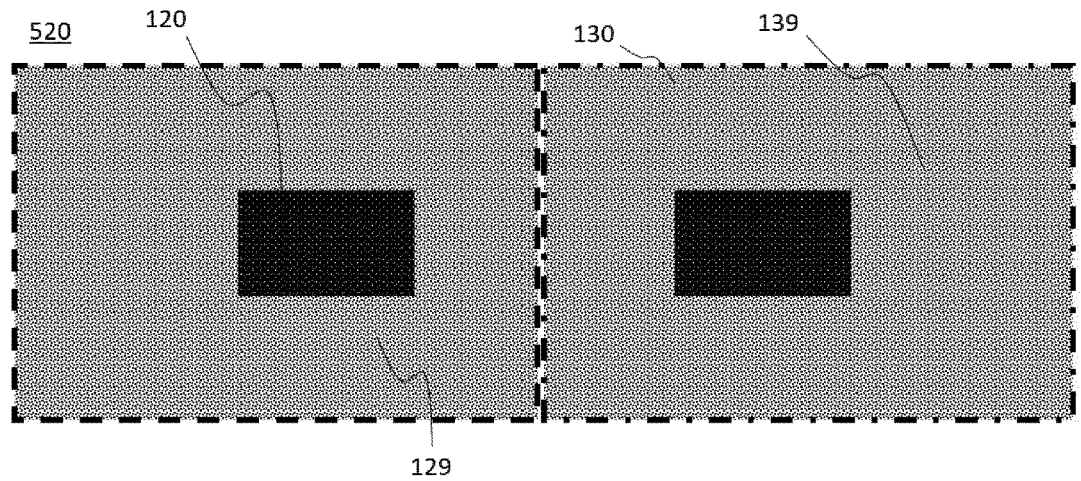
Figure 3A:
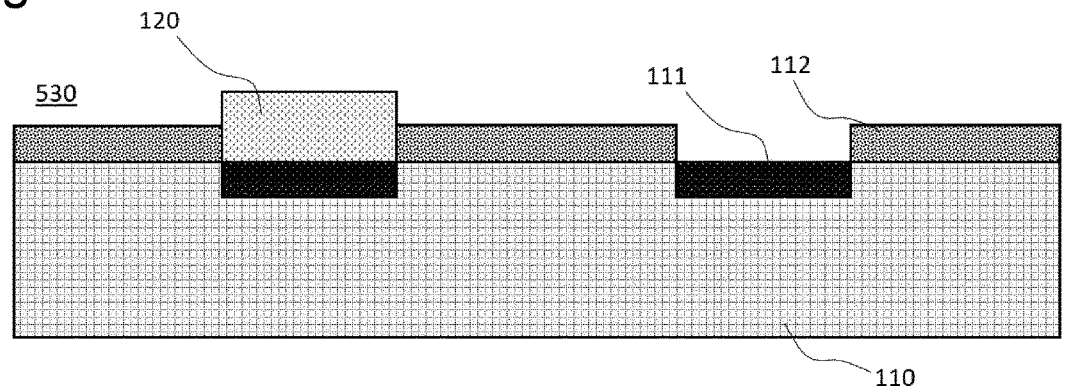
FIGS. 3A-3D represent a step of deposition 530 of at least one electrical contact 120 on said at least one integrated circuit 110 according to an embodiment.
Figure 3B:
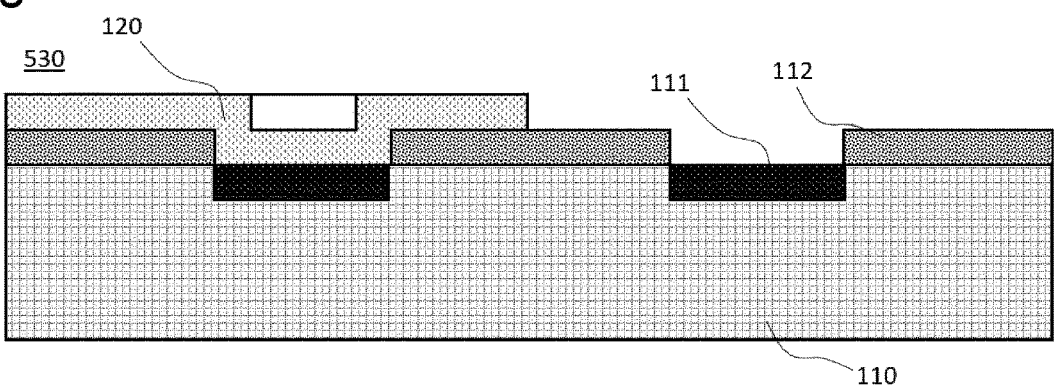
Figure 3C:
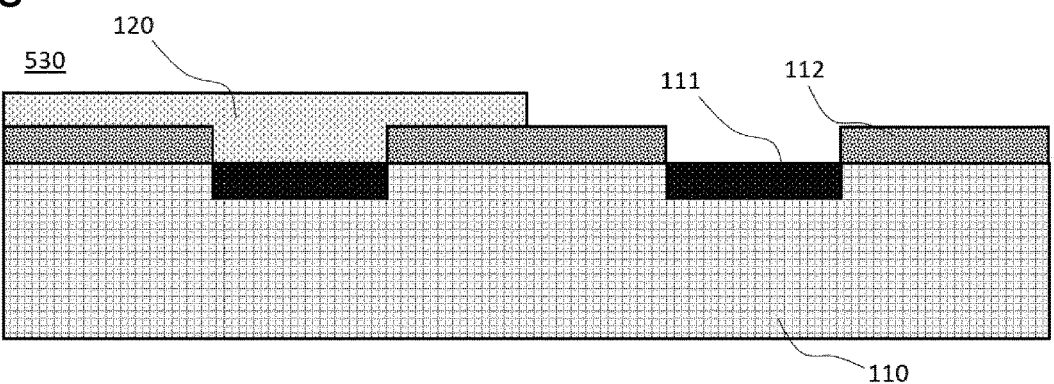
Figure 3D:
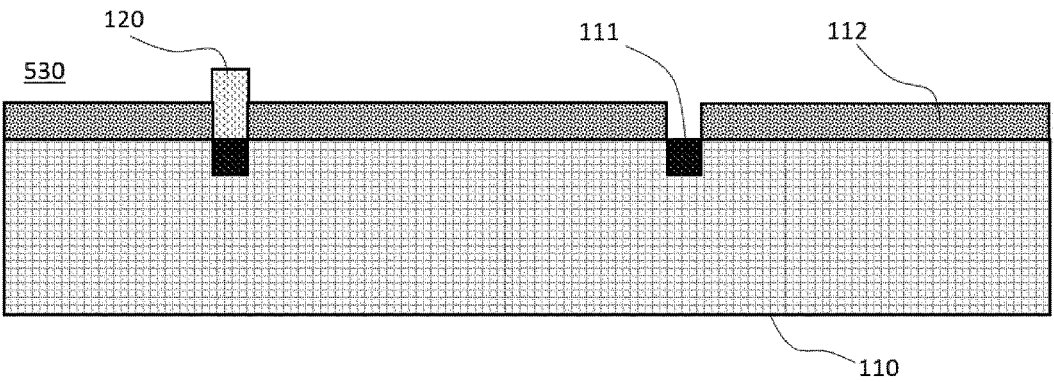
Figure 4A:
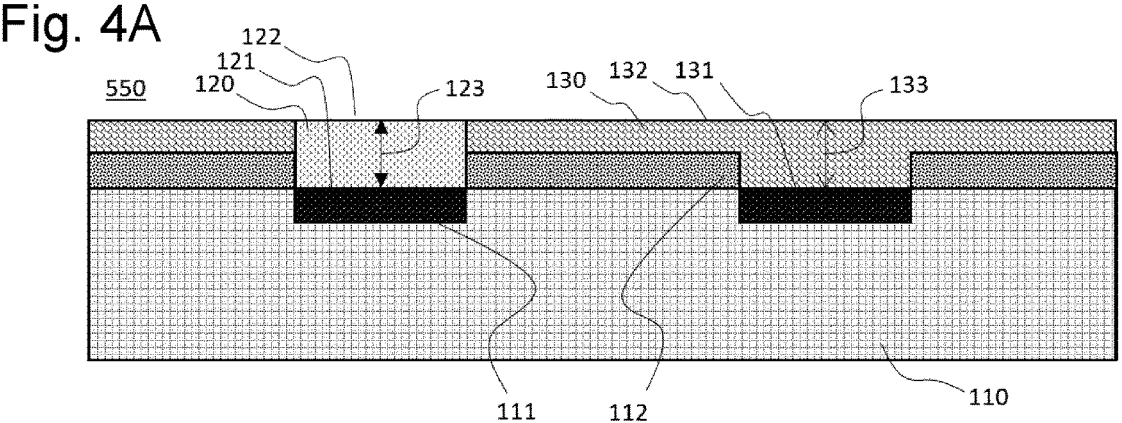
FIGS. 4A-4D represent a step of re-passivation 550 of said at least one integrated circuit 110 on said at least one integrated circuit 110 according to an embodiment.
Figure 4B:
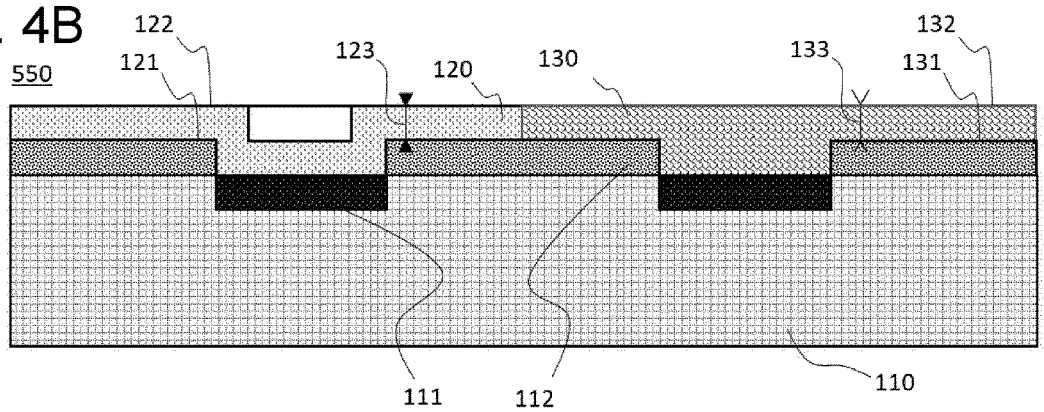
Figure 4C:
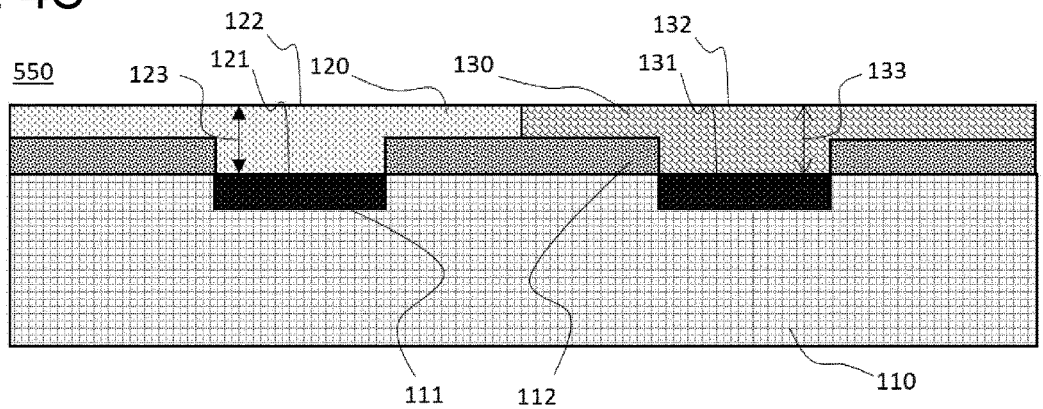
Figure 4D:
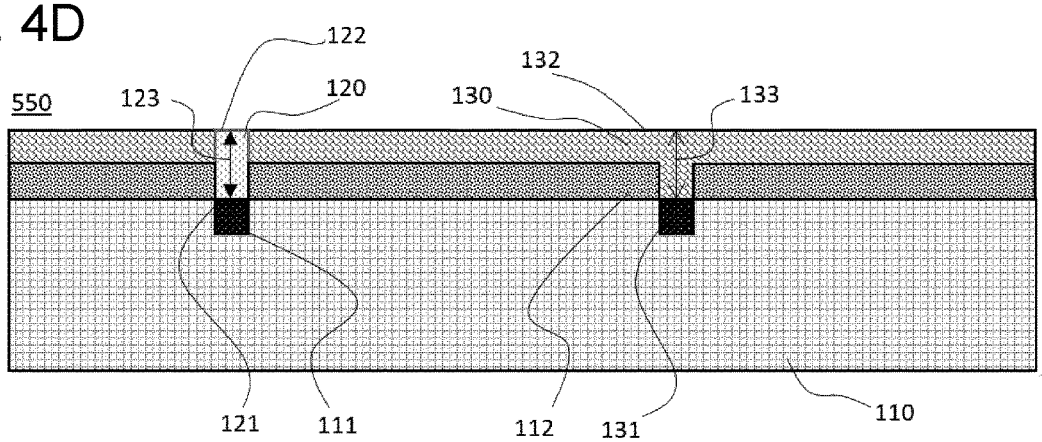
Figure 5A:
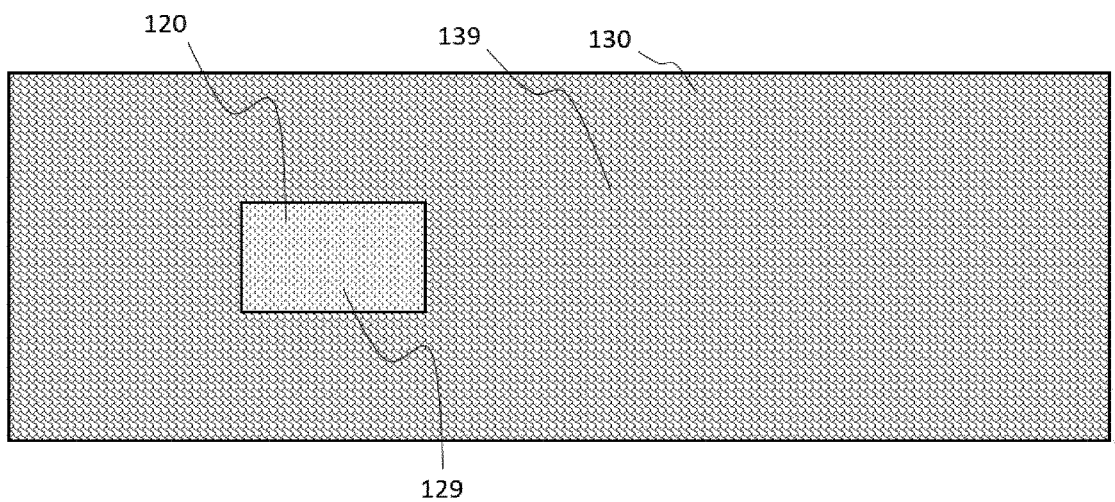
FIGS. 5A and 5B represent a top view of said at least one integrated circuit 110 after said step of deposition 530 and said step of re-passivation 550 according to an embodiment; and, FIGS. 6A-6D and 7 represent a step of an RFID Tag forming 570 by superimposing at least one film 140 on said at least one integrated circuit 110 according to an embodiment.
Figure 5B:
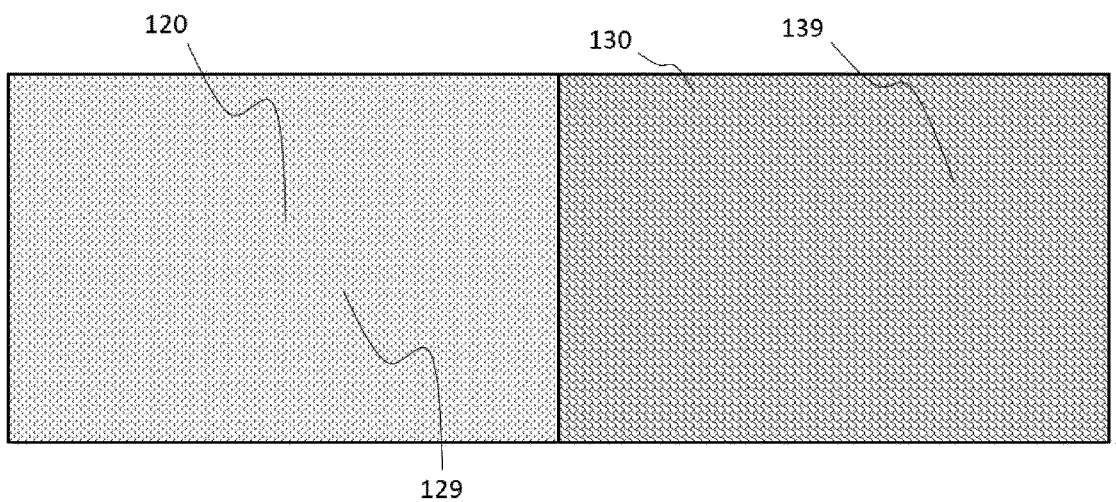

A delimitation 520 of at least one first portion 129 and at least one second portion 139 is realized on said at least one integrated circuit 110, as shown in FIGS. 2A and 2B, and said at least one first portion 129 is distinct of said at least one second portion 139.

FIGS. 3A-3D illustrate how said at least one electrical contact 120 is deposited 530 directly on and in contact with said at least one IC contact 111 and/or with said at least one dielectric layer 112 in said at least one first portion 129. Said at least one IC contact 111, illustrated in FIGS. 3A-3C, may be larger than usual and may be called large pad for example, and said at least one IC contact 111 may support said at least one electrical contact 120 all over the pad surface.

A re-passivation 550 of said at least one integrated circuit 110 is done by depositing at least one re-passivation layer 130 directly on and in contact with said at least one integrated circuit 110, preferably by deposition of said at least one re-passivation layer 130 directly on and in contact with said at least one IC contact 111 and/or with said at least one dielectric layer 112, as shown in FIGS. 4A-4D, in said at least one second portion 139. It is unnecessary to specify that said deposition step 530 and re-passivation 550 step might be done in consecutively, simultaneously or in a different order.

Thus, said at least one electrical contact 120 does not overlap said at least one re-passivation layer 130 or vice versa, and the thermo-compression applied during the film assembly 570 method generates a constant distance, rather thickness, between said at least one integrated circuit 110 and the top of said at least one electrical contact 120 and the top of said at least one re-passivation layer 130.

Indeed, said at least one electrical contact 120 is deposited 530 with at least one primary dimension 123 and said at least one re-passivation layer 130 is deposited with at least one secondary dimension 133; a dimension ratio of said at least one primary dimension 123 to said at least one secondary dimension 133 may be comprised between 0.5 and 2, preferably between 0.9 and 1.11, and may be measured via a high Resolution Scanning Electron Microscope, HR-SEM for short, like Hitachi S-4800.

Said at least one electrical contact 120 comprises at least one first electrical contact surface 121 and at least one second electrical contact surface 122 opposite to said at least one first electrical contact surface 121, as shown in FIGS. 4A-4D, said at least one primary dimension 123 may be defined as being comprised between said at least one first electrical contact surface 121 and said at least one second electrical contact surface 122.

Regarding said at least one secondary dimension 133, said at least one secondary dimension 133 may be comprised between at least one first re-passivation layer surface 131 of said at least one re-passivation layer 130 and at least one second re-passivation layer surface 132 of said at least one re-passivation layer 130 opposite to said at least one first re-passivation layer surface 131. In other words, said at least one primary dimension 123 and/or said at least one secondary dimension 133 may be considered as being the thickness of said at least one electrical contact 120 and/or of said at least one re-passivation layer 130 respectively. As early mentioned, said at least one primary dimension 123 and/or said at least one secondary dimension 133 may be measured via HR-SEM.

Figure 6A:
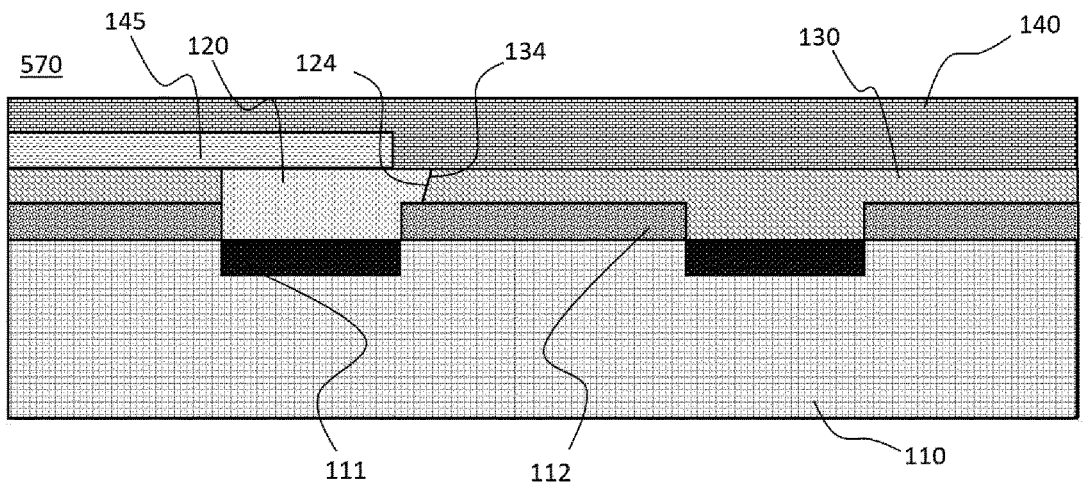
Figure 6B:
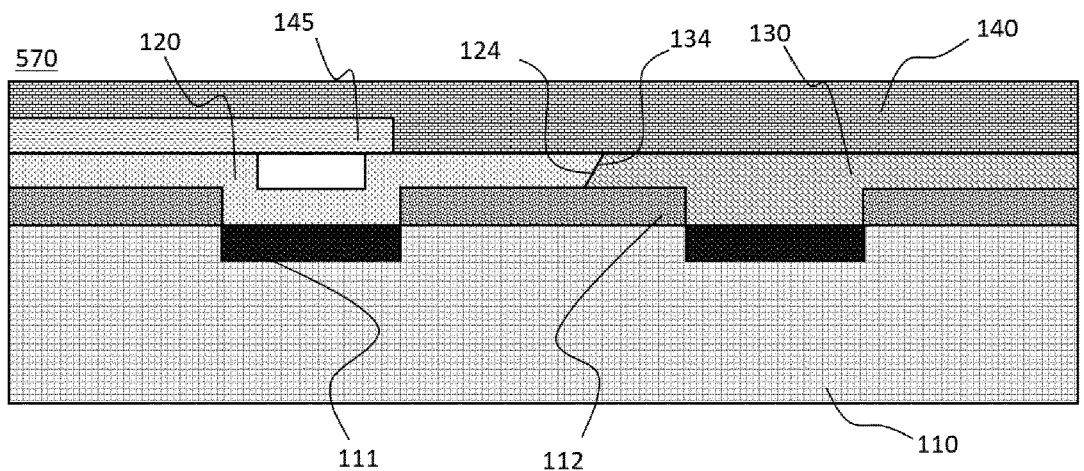
Figure 6C:
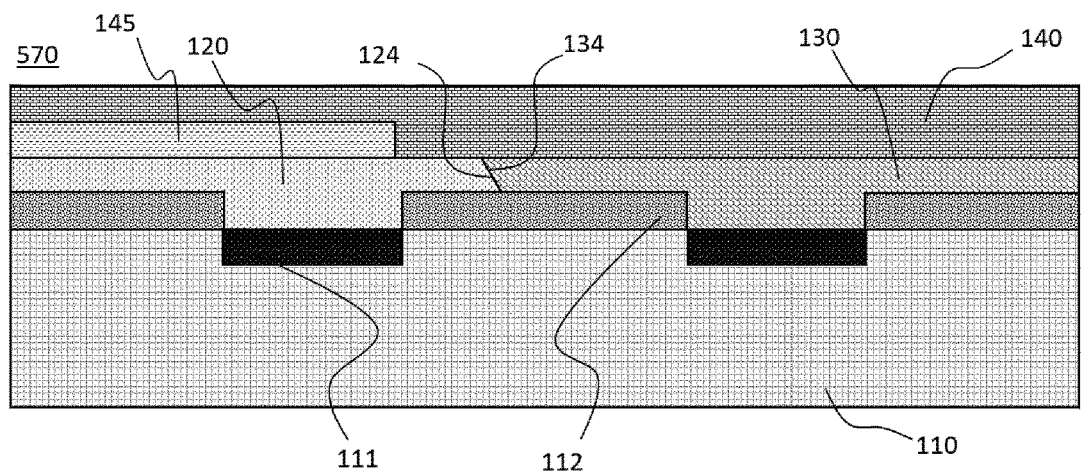
Figure 6D:
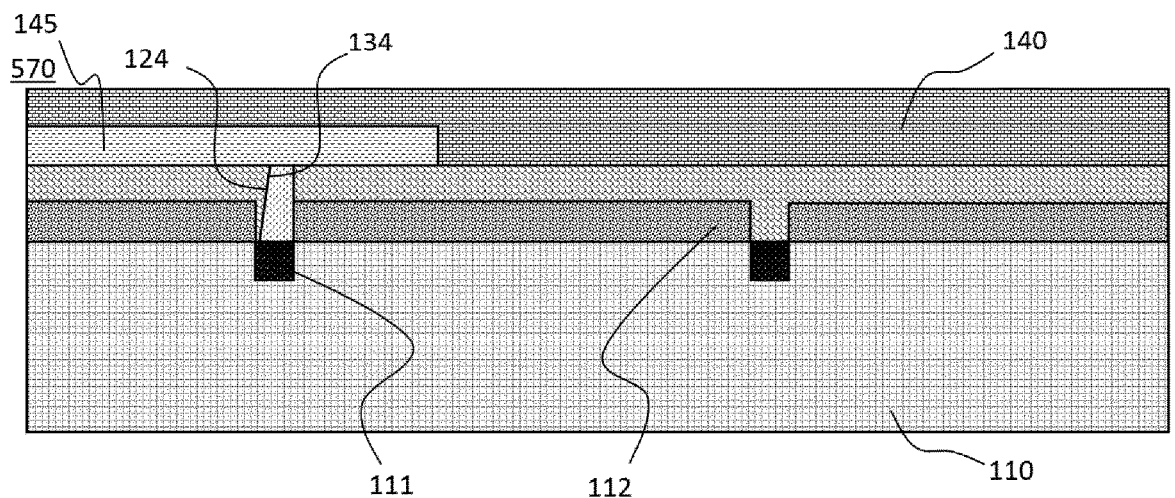
Figure 7:
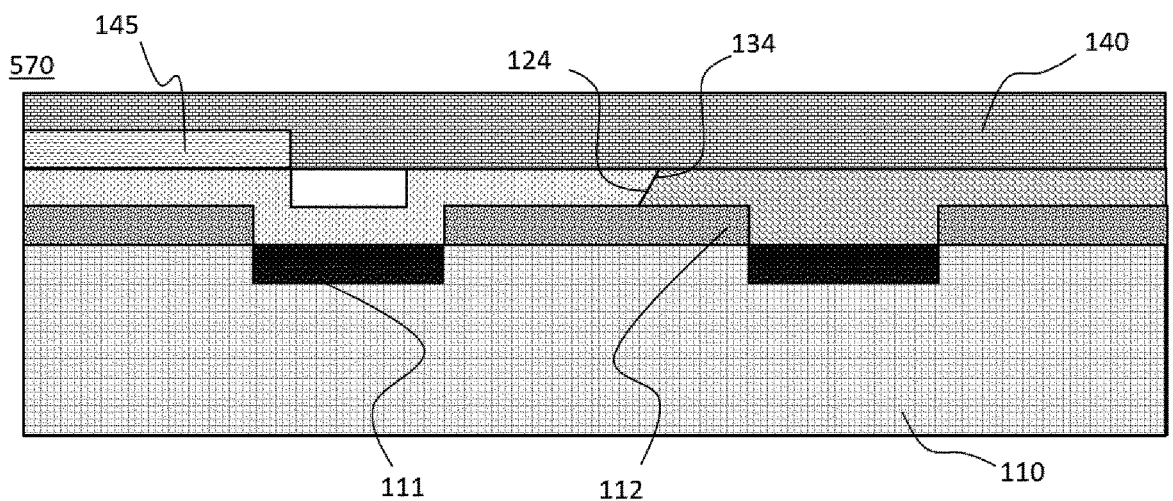

Further, in order to form 570 an RFID Tag, at least one film 140 is deposited directly on said at least one re-passivation layer 130, and said at least one film 140, comprising at least one antenna terminal 145, may forms an electrical contact by contacting said at least one antenna terminal 145 to said at least one electrical contact 120. Said at least one film 140 is also called inlay and may be, for example, a paper substrate and/or a PET substrate with metallization traces, like aluminum, copper, silver, a conductive material or an alloy thereof, forming an antenna. Said at least one film 140 may be able to be applied on top of said at least one electrical contact 120, as illustrated in FIGS. 6A-6C, and the mechanical and electrical properties previously mentioned may be also applicable in this case.

Thus, as depicted in FIGS. 6A-6D and 7, the thermo-compression applied during the film assembly 570 method generates a constant distance, rather thickness measureable via HR-SEM, between said at least one integrated circuit 110 and the top of said at least one electrical contact 120 and the top of said at least one re-passivation layer 130 such as the antenna terminal 145 and the input of said at least one integrated circuit 110 match and the RFID assembly performance remains within specification.

Further, during the thermo-compression applied during the film assembly 570, it may be possible that said at least one electrical contact 120 and/or said at least one re-passivation layer 130 may go over of said at least one first portion 129 and/or of said at least one second portion 139.

As depicted in FIGS. 6A-6D and 7, said at least one electrical contact 120 may comprise at least one intermediate electrical contact surface 124, typically at least one peripheral electrical contact surface 124. In other word, said at least one first electrical contact surface 121 and at least one second electrical contact surface 122 are linked via said at least one intermediate electrical contact surface 124.

Said at least one re-passivation layer 130 may comprise at least one intermediate re-passivation layer surface 134, typically at least one peripheral re-passivation layer surface 134. In other word, said at least one first re-passivation layer surface 131 and said at least one second re-passivation layer surface 132 are linked via at least one intermediate re-passivation layer surface 134.

And when the thermo-compression applied during the film assembly 570, said at least one intermediate electrical contact surface 124 may be directly on or under and in contact with said at least one intermediate re-passivation layer surface 134. However, said at least one electrical contact 120 does not overlap said at least one re-passivation layer 130 or vice versa, since said at least one first electrical contact surface 121 is not on said at least one second re-passivation layer surface 132 or said at least one first re-passivation layer surface 131 is not on said at least one second electrical contact surface 122.

According to some thermo-compression parameters or according to the dimension of said at least one primary dimension 123 and said at least one secondary dimension 133, said at least one first electrical contact surface 121 may be on said at least one second re-passivation layer surface 132 or said at least one first re-passivation layer surface 131 may be on at least one second electrical contact surface 122, but said at least one first electrical contact surface 121 never covers totally said at least one second re-passivation layer surface 132 and or said at least one first re-passivation layer surface 131 never covers totally said at least one second electrical contact surface 122. Thus, thanks a cross-sectional view of said RFID assembly 100 and measured via HR-SEM, said at least one electrical contact 120 has substantially the same dimension, rather thickness as said at least one re-passivation layer 130, and when the thermo-compression applied during the film assembly 570 method generates a constant distance, rather thickness, between said at least one integrated circuit 110 and the top of said at least one electrical contact 120 and the top of said at least one re-passivation layer 130.

The invention claimed is:

1. An assembly method for an RFID assembly, comprising:
    providing an integrated circuit comprising an IC contact and a dielectric layer;
    depositing an electrical contact directly on and in contact with the IC contact and/or with the dielectric layer; and
    re-passivating the integrated circuit by depositing a re-passivation layer directly on and in contact with the integrated circuit, by deposition of the re-passivation layer directly on and in contact with the IC contact and/or with the dielectric layer,
    wherein the electrical contact has a first electrical contact surface and a second electrical contact surface opposite to the first electrical contact surface, and the first and second contact surfaces are linked via an intermediate electrical contact surface,
    the re-passivation layer has a first re-passivation layer surface and a second re-passivation layer surface opposite to the first re-passivation layer surface, and the first and second re-passivation surfaces are linked via an intermediate re-passivation layer surface, and
    the intermediate electrical contact surface is directly on or under and in contact with the intermediate re-passivation layer surface.

2. The assembly method according to claim 1, wherein the depositing step further comprises depositing the electrical contact on a first portion, and/or depositing the re-passivation layer is on a second portion, the first portion being distinct from the second portion.

3. The assembly method according to claim 1, wherein the depositing step further comprises depositing the electrical contact with a primary dimension and depositing the re-passivation layer with a secondary dimension, and
    wherein a dimension ratio of the primary dimension to the secondary dimension is between 0.5 and 2.

4. The assembly method according to claim 3, wherein
    the primary dimension is a distance between the first electrical contact surface and the second electrical contact surface, and the secondary dimension is a distance between the first re-passivation layer surface and the second re-passivation layer surface.

5. The assembly method according to claim 3, wherein the first electrical contact surface is directly on and in contact with the IC contact and/or with the dielectric layer, and/or the first re-passivation layer surface is directly on and in contact with the IC contact and/or with the dielectric layer.

6. The assembly method according to claim 1, further comprising RFID Tag forming by superimposing a film directly on and in contact with the electrical contact and the re-passivation layer.

7. The assembly method according to claim 1, further comprising providing an inlay including an antenna terminal, and said RFID Tag forming comprises contact forming by contacting the antenna terminal to the electrical contact.

8. An RFID assembly comprising:
    an integrated circuit including an IC contact and a dielectric layer;
    an electrical contact being disposed directly on and in contact with the IC contact and/or with the dielectric layer; and
    a re-passivation layer being disposed directly on and in contact with the integrated circuit,
    wherein the electrical contact has a first electrical contact surface and a second electrical contact surface opposite to the first electrical contact surface, and the first and second contact surfaces are linked via an intermediate electrical contact surface, the re-passivation layer has a first re-passivation layer surface and a second re-passivation layer surface opposite to the first re-passivation layer surface, and the first and second re-passivation surfaces are linked via an intermediate re-passivation layer surface, and the intermediate electrical contact surface is directly on or under and in contact with the intermediate re-passivation layer surface.

9. The RFID assembly according to claim 8, wherein the electrical contact comprises a first portion and/or the re-passivation layer comprises a second portion, the first portion being distinct from the second portion.

10. The RFID assembly according to claim 8, wherein the electrical contact comprises a primary dimension and the re-passivation layer comprising a secondary dimension, and wherein a dimension ratio of the primary dimension to the secondary dimension being is between 0.5 and 2.

11. The RFID assembly according to claim 10, wherein said primary dimension is a distance between the first electrical contact surface and the second electrical contact surface, and the secondary dimension is a distance between the first re-passivation layer surface and the second re-passivation layer surface.

12. The RFID assembly according to claim 11, wherein the first electrical contact surface is directly on and in contact with the IC contact and/or with the dielectric layer, and/or the first re-passivation layer surface is directly on and in contact with the IC contact and/or with the dielectric layer.

13. The RFID assembly according to claim 8, further comprising an inlay including an antenna terminal directly connected to the electrical contact.

14. An RFID assembly, comprising:

an integrated circuit including an IC contact and a dielectric layer;

an electrical contact being disposed directly on and in contact with the IC contact and/or with the dielectric layer; and a re-passivation layer being disposed directly on and in contact with the integrated circuit, wherein the electrical contact has a first electrical contact surface and a second electrical contact surface opposite to the first electrical contact surface, the re-passivation layer has a first re-passivation layer surface and a second re-passivation layer surface opposite to the first re-passivation layer surface, a primary dimension is a distance between the first electrical contact surface and the second electrical contact surface, and a secondary dimension is a distance between the first re-passivation layer surface and the second re-passivation layer surface, and a dimension ratio of the primary dimension to the secondary dimension is between 0.5 and 2.

* * * * *